United States Patent [19]

Chen et al.

[11] Patent Number: 5,419,546
[45] Date of Patent: May 30, 1995

[54] DOUBLE-DOCUMENT DETECTION ARRANGEMENT

[75] Inventors: Zhongtai Chen, West Bloomfield; Ronald G. Shell, Bloomfield Hills; Randy C. Keller, Canton; J. Michael Spall, Plymouth, all of Mich.

[73] Assignee: Unisys Corporation, Blue Bell, Pa.

[21] Appl. No.: 197,420

[22] Filed: Feb. 15, 1994

[51] Int. Cl.6 .............................................. B65H 7/12
[52] U.S. Cl. ...................................................... 271/260
[58] Field of Search ......................................... 271/260

[56] References Cited

U.S. PATENT DOCUMENTS

| | | | |
|---|---|---|---|
| 2,994,528 | 8/1961 | Hull et al. | 271/260 |
| 3,589,714 | 6/1971 | Staples, Jr. et al. | 271/260 |
| 3,773,321 | 11/1973 | Burroughs | 271/260 |

Primary Examiner—David H. Bollinger
Attorney, Agent, or Firm—John J. McCormack; Mark T. Starr

[57] ABSTRACT

A method for differentiating and separating multiple overlapped like documents from single like items, transported along track means, comprising: subjecting the documents to opposed vacuum forces from suction means to separate them at a separation-station; then determining whether the documents are single or multiple, by measuring and analyzing the resulting pressure differentials within the suction system; using a cyclonic filter for removing and storing dust and debris entrained within the suction-conducting airflow, the cyclonic filter and suction system being designed and adapted to provide a relatively constant vacuum-generating airflow regardless of the nature or quantity of debris removed; plus a pressure sensor for indicating whether one or several documents are passing.

11 Claims, 8 Drawing Sheets

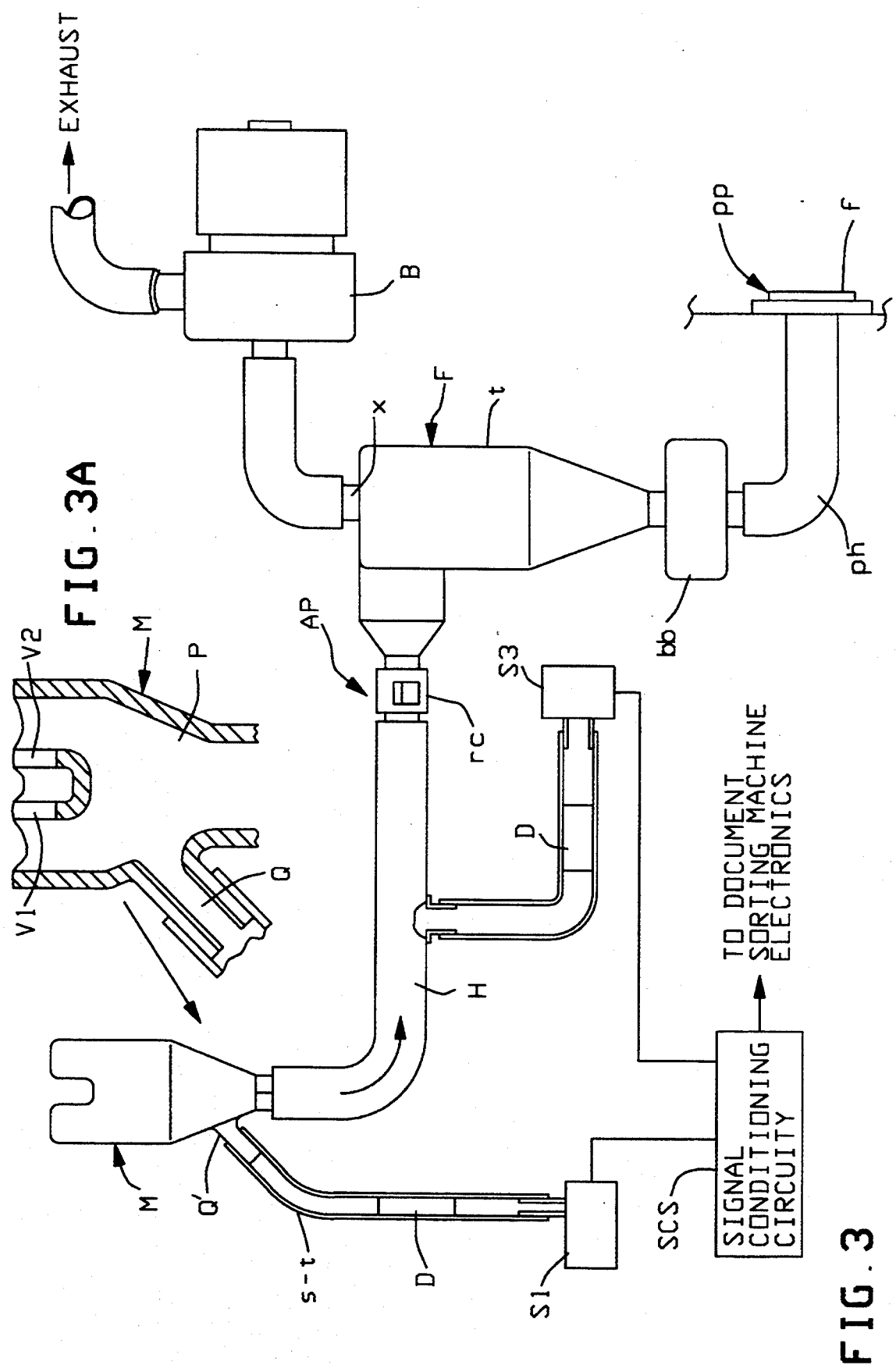

DOUBLE-DOCUMENT DETECTION ARRANGEMENT

RELATED APPLICATION

Note is taken of our related U.S. Ser. No. 08/176,268, filed 30 Dec. 1992 and assigned in common. We herewith claim the benefit of its U.S. filing date.

FIELD OF INVENTION

This invention relates to document detection systems, and particularly to those using a vacuum-separation method to identify and signal double documents and employing associated vacuum generating, coupling and sensing means. Particular attention is given to the use of such systems in high-speed document processing machinery.

BACKGROUND, FEATURES

Workers in the field of high-speed document processing, such as in the sorting of bank checks and like financial instruments, know that the art requires the use of machines and systems capable of moving and processing very large volumes of documents at rates of thousands of documents per minute, while performing multiple and inter-related operations upon each document as it travels through such machinery. Such operations might include, but are not limited to, printing upon the documents, reading data previously encoded thereon by a variety of processes, recording an archival image of the document by photographic or electronic-imaging techniques, and other processes and manipulations.

The "Doubles" Problem

Workers understand that, while processing such large volumes of documents, it is vital that each individual document be transported and processed singly, and that documents remain in the order and sequence in which they were processed by the machine. To attain the rates of document processing required, the documents are fed and separated from one another by machinery, which is extensively designed and engineered to ensure that documents are fed one at a time ("Singly") with a very high degree of reliability. Should two or more documents be accidentally fed and processed together, extensive manual effort and time are required to track down this error among the many thousands of documents which the machine may process within a very brief time. For this reason, the most extreme measures are implemented to ensure that the document feeding and separating measures always feed documents one at a time, no matter what their condition.

Nonetheless, there are occasional unavoidable circumstances where the machinery will feed more than one document at a time. Examples are documents which are stapled or glued together, documents which adhere to one another due to ink or other surface treatments, or documents which are attached one another by mutual tears or folds. Such cases are known in the art as "double-documents" or simply "doubles". Human operators for such sorting and processing machinery are aware that "doubles" are a costly and time-consuming event, and guard against them as far as possible; still, the sheer volume of documents means that a "double" will occur from time to time.

For this reason, workers find that the machinery itself must contain a reliable device for separating and detecting "doubles" as soon as possible after they have been fed; preferably before much processing is performed on them. In this way, the operator may be warned of the presence of a "double" before it can cause a disruption to the normal flow of work (e.g., and remove it).

We have contemplated different techniques for reliably sensing and reporting a double-document. Such techniques must take account of the widely varying characteristics of the documents (e.g., thickness, density, opacity, etc.), as well as the increasing document speeds which are the result of continuing efforts to increase the processing rate. Theoretically, "doubles" might be sensed optically, mechanically or electronically—as noted below:

Optical Sensing

By shining a beam of light through the document and measuring how much of the beam passes through to impinge on a sensor, the additional thickness of a second document should produce a measurable change in signal.

This technique, while practical in principle, tends to perform poorly in service. The wide range of characteristics of the documents being fed, especially as regards opacity and thickness, renders such a technique difficult to implement in practice. Because such a system must tend to operate in a "fail-safe" mode, it has to lead to a high incidence of false "doubles". Such a false report is almost as disruptive as a real "double" would be.

Additionally, optical sensors are very susceptible to failure due to the high levels of dust and debris found around document processing machinery.

Mechanical Sensing

By passing the document between a known reference point and some moving effector, such as a stylus or roller, the thickness of the document may be measured by means of one of a variety of sensors. The additional thickness of a second document should be measurable.

Once again, the wide range of characteristics for documents fed make this a poor system. The thickest documents may well be more than twice the thinnest, causing a high incidence of "false doubles". Additionally, the sensors required to detect mechanical variations of this order are sensitive and costly, and require skilled and time-consuming calibration to give a reliable result.

Electronic sensing, relying on the variation of a parameter such as reluctance or permeability to detect the presence of documents.

Again, the range of document characteristics render such techniques less than successful, also they require the use of costly, custom-sensing elements.

Rather, we settled on a vacuumatic separating/sensing technique; and found it to give high reliability regardless of the nature and condition of the documents. This invention seeks to teach improvements in such techniques to enhance reliability, serviceability and whole-life cost.

Basic Vacuumatic System (FIGS. 1, 1A)

FIGS. 1, 1A, 2 show a basic, simplified version of a vacuum-separation and sensing system of the type we first favored. Here, it will be understood that the documents to be sensed are transported in a vertical position by transport means such as belts, pulleys and the like (not shown, but well understood in the art). The documents d are constrained to pass through a vacuum-separation manifold M which encloses the lower longitudinal edge of the document as it passes.

This manifold incorporates two vacuum ports V1 and V2, each disposed on a respective side of the document. The two ports are connected to a common plenum chamber P, which is kept at negative pressure relative to the surrounding atmosphere by vacuum blower means B, (or the like) connected to plenum P by hose means H.

Connected to a port Q provided in the wall of hose means H is a differential pressure switch S1 which compares the pressure within the hose to the ambient atmospheric pressure.

When no document is present, both vacuum ports V1 and V2 are open and unobscured, and air may freely flow into them under the influence of blower means B. The pressure differential between the inside of hose H and the surrounding atmosphere is "LOW" ($\Delta P_L$).

When a single document passes through manifold M, it will be pulled towards one or other of the two vacuum ports V1–V2 by the suction applied from blower B; the document will tend to close off whichever of the ports it is first drawn to. The other port will remain open and unobstructed. The document will cause some reduction in the airflow through ports V and there will be a "Moderate" pressure differential ($\Delta P_M$) between the inside of hose H and the surrounding atmosphere.

When two or more documents pass through manifold M side-by-side (or just overlapping), they will tend to be separated by the suction applied from blower B and each will tend to be drawn to an adjacent vacuum port V. When one port is closed and blocked by a document, the suction at the other port will be increased by virtue of the restriction of the airflow, so this port will tend to draw-in the second document even more strongly. When both ports are thus closed and blocked, airflow is very quickly reduced to almost nil very quickly and the differential pressure between the inside of hose H and the surrounding atmosphere will very quickly rise to the highest level of vacuum ($\Delta P_h$) which blower B is capable of sustaining at this point.

It will thus be seen that, by monitoring the pressure differential between the inside of hose H and the surrounding atmosphere, an indication of the presence of more than one document in manifold M may be obtained which is more or less independent of any physical characteristic of the documents (such as opacity, thickness, color and so on) and is also independent of the number of documents present. By selecting a threshold of pressure differential for switch S1 which corresponds to "both ports V covered" (e.g., $\Delta P_h$), such an arrangement can automatically indicate "more than one document", regardless of the actual number of documents involved, and regardless of their individual characteristics.

The action of switch S1 is converted to an electrical signal, which is processed by signal-conditioning circuitry (not shown, but familiar to workers in the art) and provides to the controlling systems of the (check-sorting) machine an indication that a "double" has been detected. The controlling systems can then direct the suspected "double" to a holding area of the machine, without further processing, and alert the machine operator, who may investigate the item manually to correct or otherwise resolve the "double".

Since such a "doubles-detect" arrangement was first contemplated, there has been significant progress in the design of check sorting machines. Document speeds and feed rates have increased, and the types and quality of documents handled have expanded beyond any expectation. Additionally, expectations are now greater; e.g., as to convenience of operation, cleanliness, hygiene, and safety. Modifications have to be made to meet these needs. Among these conditions are the following:

Re Separation/Sense Time

Increasing document speeds have reduced the time available for a "doubles-detect" system to operate on a passing document and determine whether it is a "double". As an example, the Unisys DP1800 check sorting machine operates at a nominal track speed of 300 inches per second (ips, or 7.62 meters per second), and may operate with documents with a minimum length of 5.75 inches (11.4 centimeters). For such a document, the time available to operate on a document (e.g., to separate?) is 5.75/300 seconds, or about 19 milliseconds. Future developments are likely to increase document speed to as much as 400 ips (10.1 metres per second), with a corresponding reduction in time available for a sensor to make its determination. To allow a system to operate adequately within such reduced time periods, larger and more powerful blowers (B) have to be employed. A blower for the DP1800 product, for example, would be rated to flow 30 cubic feet of air per minute and provide a maximum vacuum of 30 inches water gauge. These high airflows and vacuums would be required to ensure that the "double" is separated within the manifold M as quickly and securely as possible, even when the documents consist of heavier paper stock with higher resistance to "bending".

Re Dust

Increasing document speeds and a wider range of document types lead to more dust and debris being generated in the machine. This material may consist of paper fragments and dust, generated by the friction of document-driving elements or from the cut and sheared edges of the paper itself, as well as rubber and plastic particles shed from the driving elements (e.g., rolls, belts and the like, as well understood by workers in the art).

Paper handling business machines (e.g., Unisys check processors) employ vacuum systems to transport or detect documents or for other functions. The vacuum is generated by vacuum pumps or blowers. These pumps/blowers require filtration of the air they move to protect their internal moving components from damage from dust/dirt in the air. Additionally, any exhaust air must be filtered to prevent contamination of the customer's office environment.

Since paper handling machinery usually generate lots of paper dust, the pump/blower air filters tend to quickly fill with dust.

Typically the air filtration systems used are "barrier type" i.e., fiberglass or porous filter paper of some type. These require frequent field service maintenance for cleaning or replacement. In a high volume site for a Unisys DP1800 document processor, these filters typically require replacement twice a week. This frequent servicing by skilled field engineers adds substantially to the maintenance cost of this type business machine.

One advantage of a "cyclone" paper dust collector is that it can contain relatively large amounts of dust in its bunker, and so reduce the required frequency of maintenance. In a DP1800 document processor for example, using a cyclone filter/blower embodiment can reduce frequency of service from twice a week to once every 3 months (or 1:24 ratio); and there are other advantages, such as:

No gradual changing pressure drop with the cyclone as with a barrier type filter.

Quick and easy bunker clean out; simply draw the collected dust out of the bunker with a standard vacuum cleaner.

Now, such dust/debris will naturally be drawn into the manifold M of a doubles-detect system under the action of the vacuum generated by blower B, and it may collect within the system. There, it may clog pipes and hoses, such as the connection to the pressure switch S1, or it may build up inside the blower B to the point where performance is reduced, requiring extensive maintenance and reducing machine up-time. Finally, such material will be (mostly) ejected from the system in the exhaust of blower B, into the surrounding atmosphere, where it creates an unsightly and unhealthy environment for attendants. It can also constitute a fire hazard if allowed to accumulate, both inside the machine and in the surrounding environment.

ΔP as Mini-pulses

Increasing speeds, and the resulting need for increasing vacuum, have also led to subtle changes in the way that a system must function and provide sensing output. The changes in pressure detected by the pressure switch S1 have become less of a mass-air-flow phenomenon (as they were at lower speeds and lower airflows) and more of a "pulse" phenomenon. Where document speeds are slower, pressures would rise and fall (in response to the states of vacuum ports V) relatively slowly and evenly throughout the system. With much higher speeds and airflows, and much shorter transitions at vacuum ports V, pressure changes now move through the system as a "pulse" of reduced pressure, entrained in a high-speed column of air moving through the system. While this is not a problem in and of itself (since the pressure switch S1 can still detect and respond to such "pulses" in the same way as if they were a more general reduction in pressure throughout the entire system), precautions have to be taken to prevent minor, spurious pulses ("mini-pulses", or transient spikes) of changing pressure from being generated and producing false results at the pressure switch. To this end, sensing port Q is moved further down hose H from manifold M to provide an effective column of air within hose H between manifold M and sensing port Q. The mass and volume of this column can act as a dynamic damper for pressure variations travelling there along, and can attenuate the magnitude of such pulses as they travel from manifold M to sensing port Q. In this way, the impact of such pulses at pressure switch S1 may be reduced,—though not entirely eliminated.

Similar problems from "mini-pulses" can also be caused by the documents themselves as they travel through manifold M. As document speeds increase, aerodynamic effects become more and more significant. A document's leading edge may "hunt" from side to side; also the entire document may assume one of several conditions, such as an undulation from side to side along its length, or a tendency to travel at an angle to the direction it is being driven in. These conditions may, in turn, lead to unexpected results at manifold M, where a single document may rapidly obscure first one vacuum port V, then the other, setting up a series of high-frequency pulses in the airflow, in Manifold M and in the various hoses connecting it to blower B. Thus, pressure switch S1 must be carefully designed and tested to ensure that such mini-pulses do not cause spurious signals. Also, more stringent measures should be taken to selectively damp the airflow to filter out and negate such mini-pulses.

Adding Filtration (FIG. 2)

FIG. 2 shows modifications in the FIG. 1 arrangement for addressing some or all of foregoing concerns. The system is altered by addition of a mechanical air filter F in hose H, and provision for adjusting the airflow through hose H is made by adding a variable orifice R at the entrance to air filter F. The air filter serves to separate dust and debris from the air stream before it enters blower B, and to prevent it from clogging the blower and/or being expelled into the surrounding environment. Variable orifice R allows the air flow (and therefore the system differential pressures), to be calibrated to a known standard, which is typically measured by applying a vacuum gauge (not shown, but well known in the art) to a test port T provided in the body of the air filter housing.

While these measures address the identified system problems, they bring problems of their own and generate new system problems. The air filter, for instance, will soon become clogged with dust and debris, thus tending to restrict airflow and alter the differential pressures within the system. As this restriction increases with the buildup of debris, the system will tend to miss doubles, since the vacuum at manifold M would be reduced. Thus, a system to warn the operator of excessive buildup of filtered material is desirable—e.g., consisting of a pressure switch S2 which measures the differential pressure across the filter and warns the operator when it reaches a predetermined level, indicating that the filter is excessively clogged. As speeds increase, the replacement period for filter elements will decrease in proportion, until, in some systems, these filters will need to be replaced every few days to maintain consistent system performance.

Also, variations in filter elements etc., will typically make it necessary to check and adjust system pressures every time the filter is changed. One can do this with variable orifice R, allowing an attendant to adjust system pressures to a known standard. This practice, while improving system performance, and maximizing filter replacement intervals, adds considerably to service time and cost.

All the foregoing conditions combine to produce a set of requirements far more stringent than were originally conceived. Since air flow rates are far higher, the system must be designed with a minimum of restrictions which might reduce the flow or produce undesired pressure effects. Variations in airflow (and therefore pressure) must be kept to a minimum over the long term, to maximize the thresholds defining a "double" and to minimize the incidence of false signals. And the system must accommodate a large and continuous supply of dirt and debris without impacting its function and (preferably) without ejecting a lot such material into a customer's environment.

This invention addresses these and related problems; e.g., teaching a doubles-separation/doubles-detect arrangement using vacuumatic means, teaching such with opposed vacuum-ports and associated pressure-sensing means to signal the presence of a single document or overlapped documents; preferably by locating such sensing means sufficiently remote from such ports to provide a damping-column adequate to attenuate, or mask-out, minor pressure variations; by teaching air-filter means and related variable orifice means and filter-pressure-sensing means to adequately filter-out contaminants entrained in the line from such ports to the vacuum source, while also allowing one to be aware of excess across-filter blockage, and to "re-tune" the system pressures once a filter element is installed/replaced.

And, beyond the foregoing, it is an object hereof to teach such a system wherein the vacuum manifold and sensing means are integrated into a single unit of minimal and controlled variability, while the supporting systems are so designed as to provide optimum airflow over long periods with minimal maintenance. The taught arrangement also includes a function whereby the sucking vacuum is kept essentially constant, and whereby dirt and debris are automatically extracted from the airflow as a function of its operation, but without use of a barrier filter and with minimal impact upon normal operation, and means whereby such foreign matter may be accumulated over long periods and purged from the system without impact upon its normal operation.

The methods and means discussed herein will be generally understood as constructed and operating as presently known in the art, except where otherwise specified; and with all materials, methods, devices and apparatus herein understood as being implemented by known expedients according to present good practice.

BRIEF DESCRIPTION OF THE DRAWINGS

These and other features of advantage of the present invention will be appreciated by workers as they become better understood by reference to the following detailed descriptions of past and present preferred embodiments which should be considered in conjunction with the accompanying drawings, wherein like reference symbols denote like elements.

FIG. (1) is a simplified schematic view of a "basic" vacuum-separation doubles-detect system as previously described with FIG. 1A enlarging the separation manifold thereof;

Figure 4C:
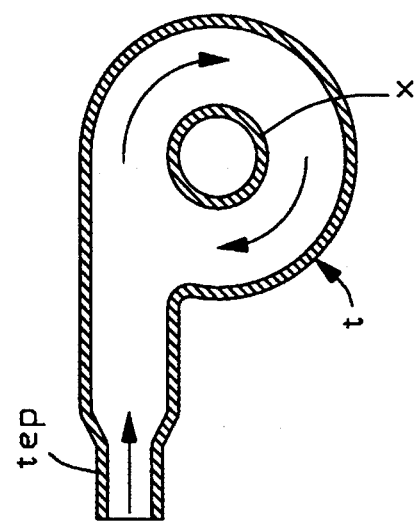
Figure 4B:
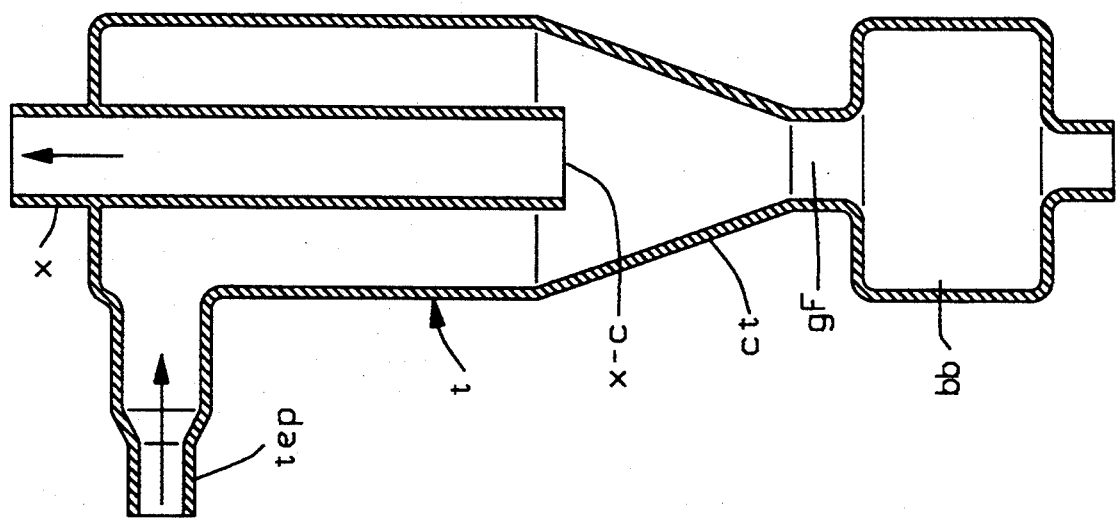
Figure 4A:
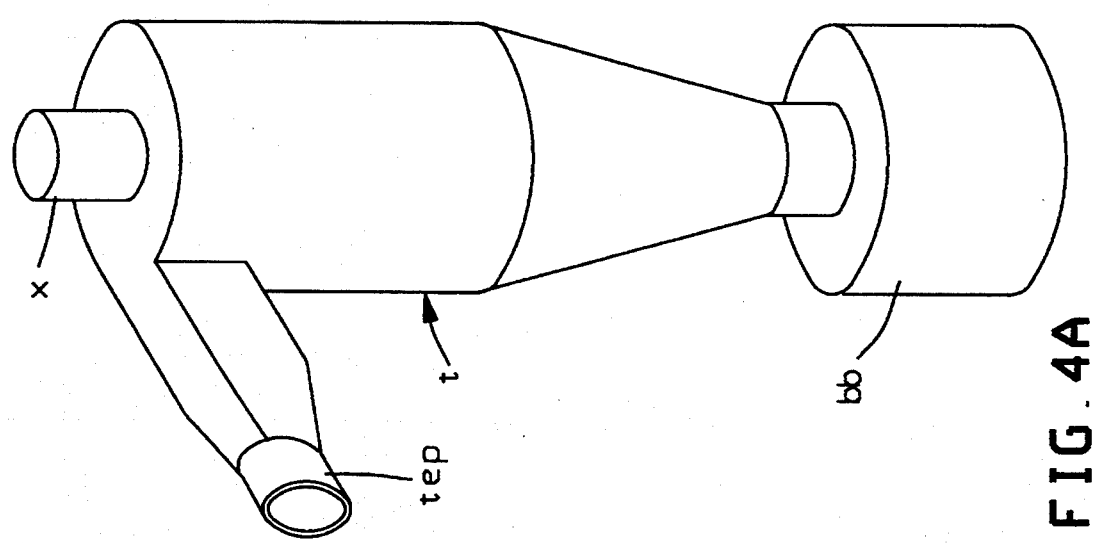
Figure 6:
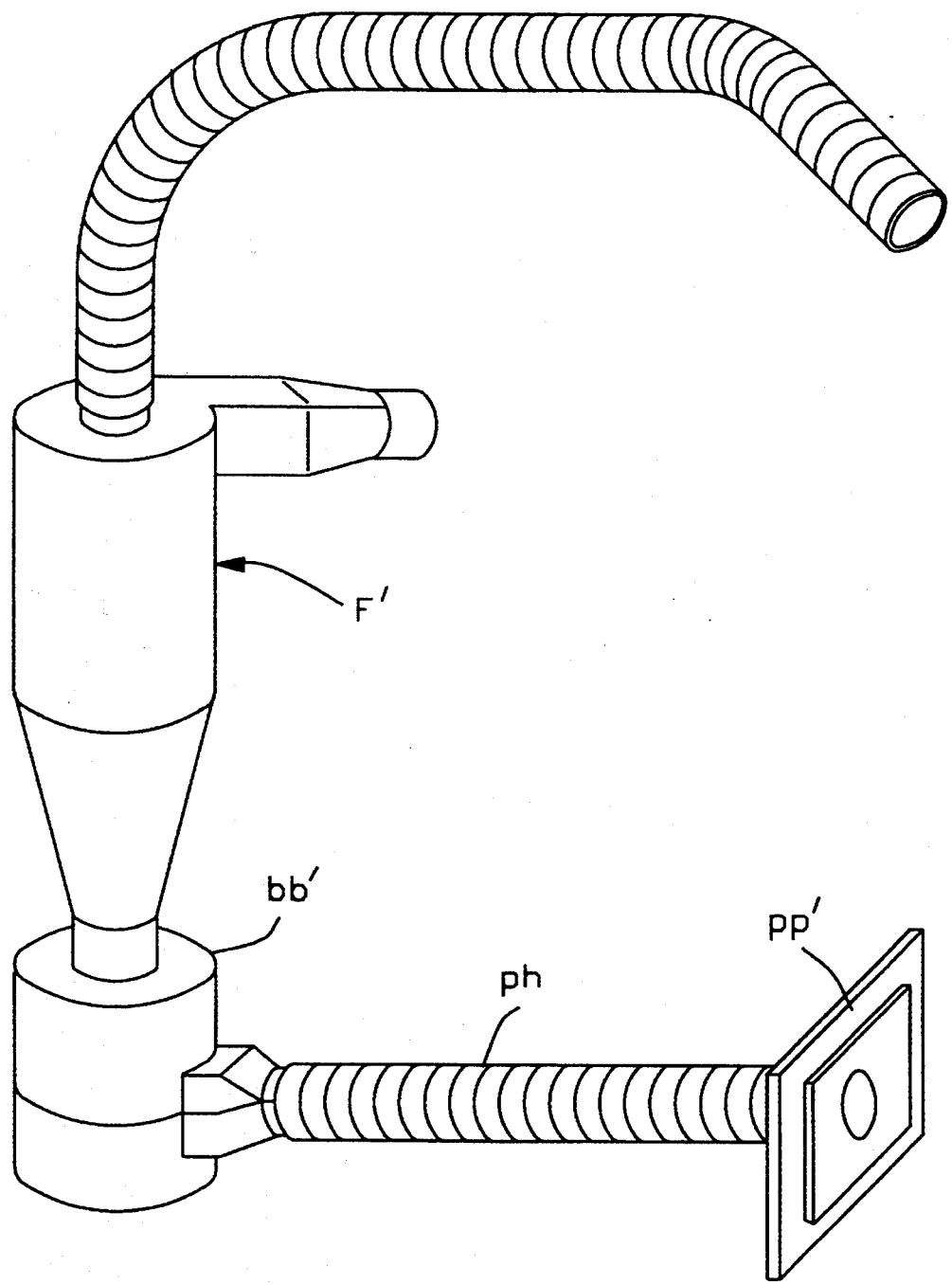
Figure 7:
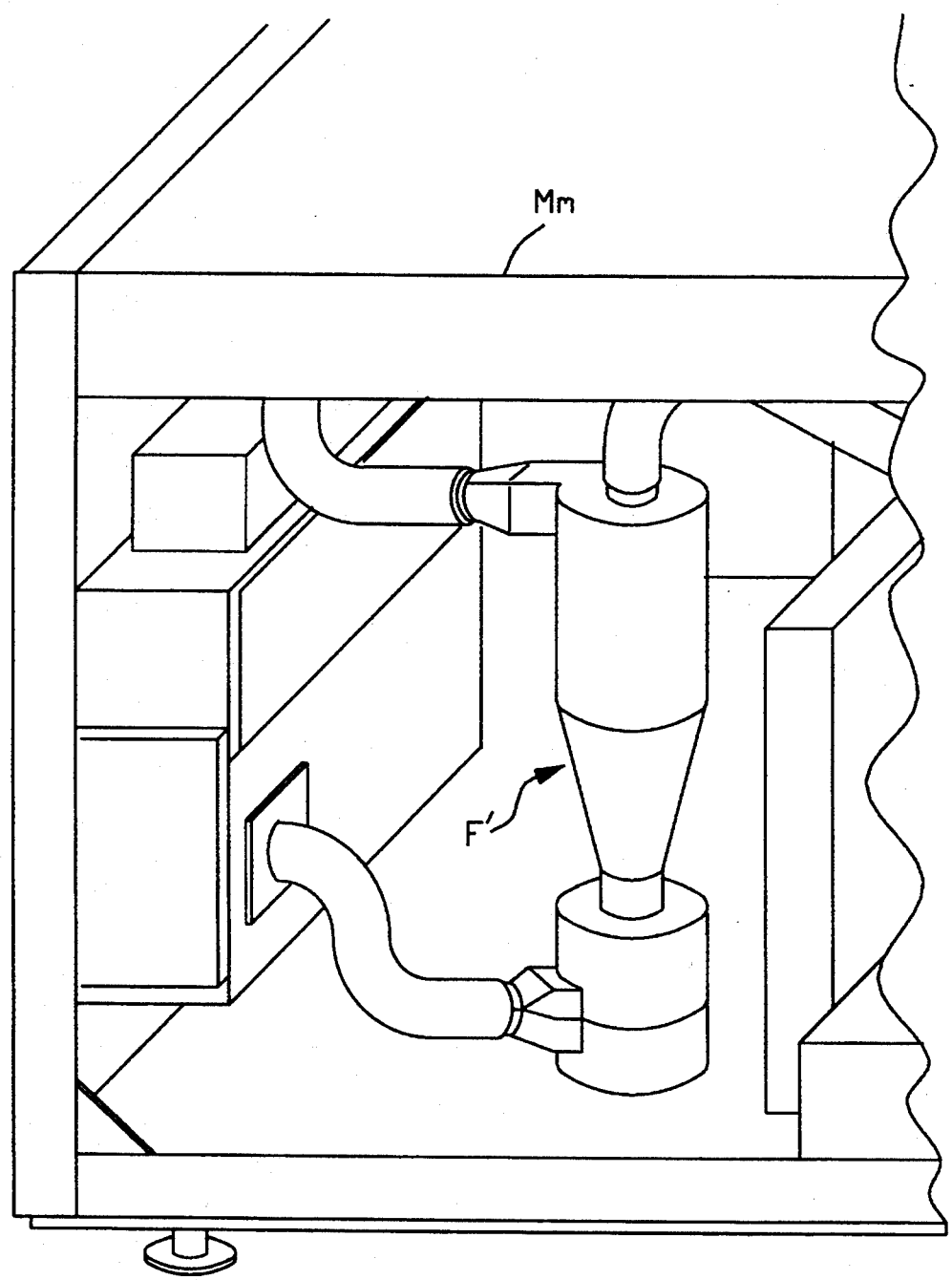
Figure 8:
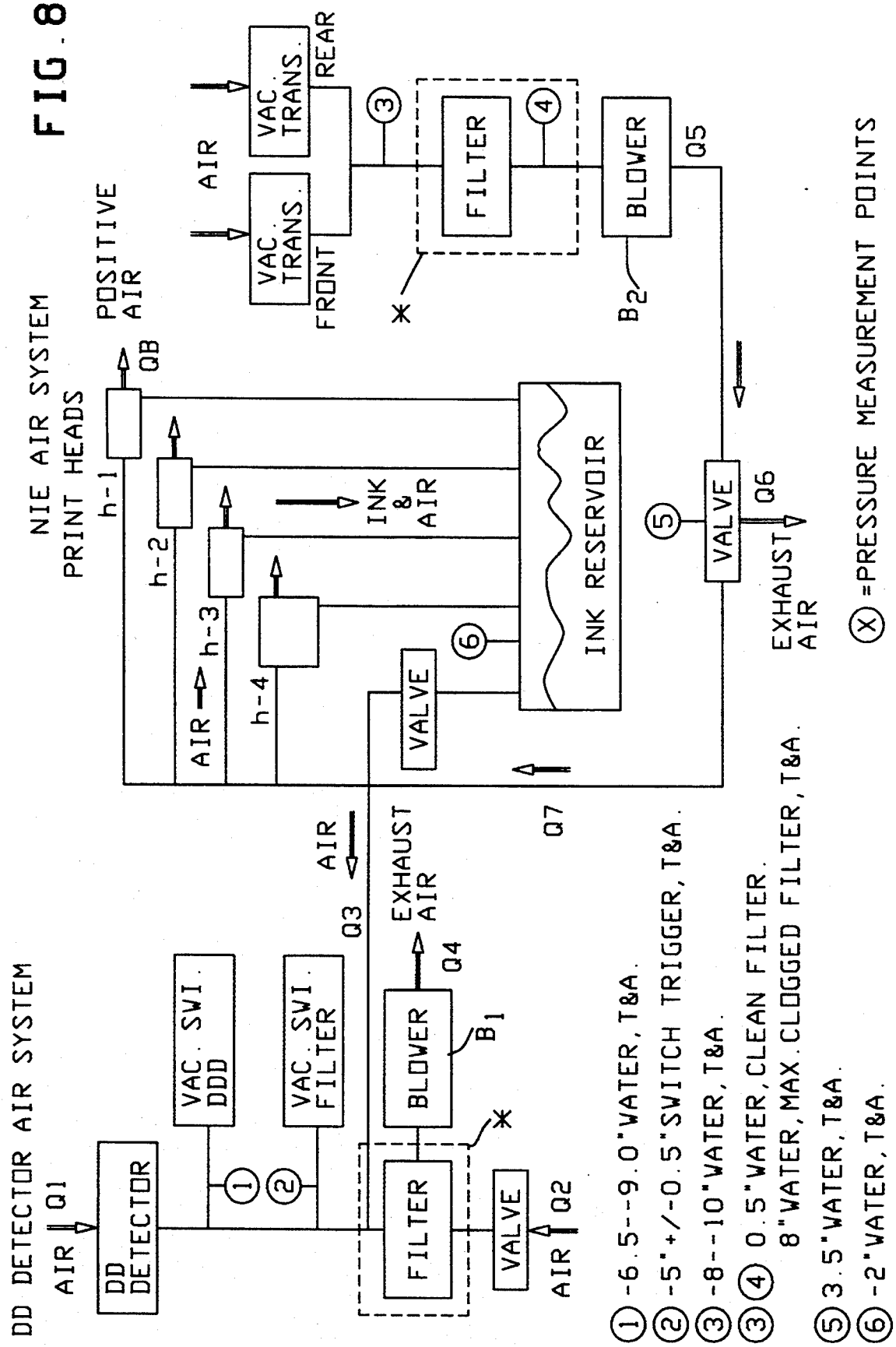

FIG. (2) is a schematic view showing how the basic system of FIG. (1) can be constructed to include features which attempt to address some shortcomings;

FIG. (3) is a schematic view of the most preferred embodiment of the present invention, with features of advantage which address many shortcomings of the systems of FIGS. (1) and (2) and FIG. 3A shows a section thereof;

FIG. (4A) shows the general configuration of a Cyclone Filter-Pump suitable for the preferred embodiment of FIG. 3 (with FIG. 4B showing a detailed sectional view of the construction, FIG. 4C a section thru entry);

FIG. (5) shows a detail of the construction of a "variable aperture" which preferably forms part of the cyclone filter shown in FIG. (4); while FIGS. 6, 7 show such a filter-pump and FIG. 8 schematically indicates a predecessor system.

GENERAL CONCEPT OF PREFERRED EMBODIMENTS

In the text foregoing, the basic technology of the vacuum-separation/doubles-detect arrangement was discussed, with particular reference to the problems which accompany present use of such a system and the difficulties we have found as system parameters became more demanding.

A more perfected system would address all these various shortcomings, and especially, it would:

filter the air to remove entrained dust and debris but would not radically change the airflow or the differential pressures of the system, regardless of the amount of debris removed or the length of service time. Such a separation system would preferentially also collect the removed debris so it could be easily purged with minimal intervention by service personnel;

be constructed so that the pressure switch sensing pressure changes caused by a "double" would be (so far as possible) immune to transient minor pressure pulses and to other effects associated with high-speed transport of documents; and include provision for engineered and variable damping of the response of the pressure switch to allow the system to be tuned to provide the most reliable response despite varying document conditions.

DESCRIPTION OF A PREFERRED EMBODIMENT

A most preferred embodiment of the present invention is shown semi-schematically in FIG. (3).

The vacuum separation of documents, and the pressure effects produced by different combinations of documents, remain unchanged from that previously described, and the configuration of vacuum ports V and manifold M immediately surrounding them is as previously described.

"At-Plenum" Sensing Port Q

However, in contrast to previous embodiments, the vacuum manifold M in the area of plenum P is here redesigned to incorporate a sensing port Q within plenum P, placed as close as possible to the two vacuum ports V, but sufficiently far from them that the pressure changes experienced at the site of said ports are the result of the combined influence of both vacuum ports V, and are not influenced at any given time by the pressure at one port more than the pressure at the other port. In this manner, changes in pressure, corresponding to different combinations of documents, may be imparted to pressure switch (sensor) S1 as quickly as possible, and without the intervention of an unduly-long air passage inherent in hose H as in previous embodiments.

In previous embodiments, the length of hose H between plenum P and sensing port Q was to also be used as an "air-column damper" to absorb the effects of minor undesired pressure pulses as previously described. This application was prone to variation and error due to variations in the manufacture and assembly of hose H and possible changes in its configuration once in the field. A twist or kink, imparted by a careless technician, could radically alter this damping effect and lead to a change in system performance.

Accordingly, as a feature of advantage, we have removed this air-column-damping feature and disposed sensing port Q as close as practical to plenum P, as shown in FIG. (3).

Latch

As a further feature of advantage, the signal-conditioning electronics which process the signal from pressure switch S1 are additionally redesigned to provide a variable "latch" feature which further reduces the number of false signals which the sensor may generate. This "latch" feature (not shown, but well understood in the art) operates so as to send a "double" signal to the system electronics only after the pressure switch has continuously indicated the "doubles pressure" condition for a pre-determined period of time. In this way, system "noise" generated by brief minor transient high-pressure pulses (air pressure spikes of very short duration, which would be minimally compensated by damping means D but might, in an extreme case, be sufficient to activate switch S1) may be effectively filtered out.

In our preferred embodiment, the "holding time" of this "latch" feature is made adjustable; we have found optimum "holding" time to be the order of 6.0 milliseconds for the described system—this corresponding to passage of about one third of the length of the shortest permitted document at the rated transport speed. We have found 6 ms long enough to filter out all false signals caused by highly transient pressure pulses (error spikes), while still more than short enough to ensure that all "doubles" are indicated by the system.

"No Vacuum" Indicator

Workers studying this system will realize that there is some (small) inherent risk, that total failure of the vacuum-producing system (e.g., Blower B goes down) will not be detected by pressure switch S1. In the normal operating state, pressure switch S1 detects only a pressure differential between the immediate area of the manifold M and the surrounding atmosphere. Should the vacuum-producing system fail entirely (e.g., by a failure of blower B or a blockage of one of the interconnecting hoses), the pressure inside manifold M and outside it will become equal and will not alter no matter how many documents pass through the manifold. In this situation, pressure switch S1 will never be activated, and a "double" could be passed.

In order to guard against such a an occurrence, various means can be employed. A rotation sensor can be added to blower B, to indicate to the document processor electronics whether or not the motor is turning. Or a flow sensor can be added to one of the interconnecting hoses, to indicate the presence, and velocity, of the airflow.

We have found, however, that the most preferred method is the use of a second pressure switch S3, disposed as shown in FIG. (3). This switch responds to differential pressure between the inside of hose H and the surrounding atmosphere. Since its only purpose is to indicate the presence or absence of vacuum in the system, it is preadjusted to respond at a relatively low vacuum level. But this low vacuum level, while providing robust sensing of the presence of a vacuum, also makes the switch more prone to spurious signals from pulse-type pressure variations, as previously described.

We could eliminate such errors by means of an electronic "latch" within the signal conditioning circuitry, as we have previously described for use with the doubles-detecting switch S1. However, this introduces additional components into the electronics and is not really warranted for such a relatively simple function. Accordingly, we prefer to eliminate the effects of minor, transient "noise" pulses on pressure switch S3 by inserting a "mechanical latch" or damper means D in the hose between it and the main hose H, as shown in FIG. (3). This damper, preferably, consists of a cylindrical slug of a sintered particulate metallic material, of known and stable permeability to air, which serves to delay the incidence of No-vacuum to switch S3, to thereby eliminate the effects of any such "spike" pressure pulse. The sintered particle size, density and overall length of damping means D may be optimized to provide consistent damping for a given set of system parameters, yet easily modified to allow for changes in system parameters (such as a change in vacuum or airflow) without need to re-engineer the entire system.

Since damping means D allows S3 to warn of vacuum loss over a relatively long time interval (as compared to the relatively brief reaction time for a "doubles-detect" as with switch S1, or vs. the even briefer transient minipulses), we find that a composition of sintered material which has a damping coefficient (time to come to equilibrium following change of pressure across it) between 10 and 30 seconds gives the most consistent and reliable result. This is more than sufficient to suppress the briefer "doubles pulse" or error all "spike" effects, yet still gives adequate warning to the system that vacuum is entirely lost.

Cyclone Blower/Filter

Air passing from manifold M and plenum P then enters a cyclone blower/filter system C comprising a cyclone blower CB with exhaust, plus a cyclone filter F with bunker bb and inlet section including variable orifice means (rotatable collar rc). Filter F etc. is more completely shown in FIG. (4) and consists of a vertical cylindrical tube t, closed at its upper end except for a vertical exhaust port x which extends down through the closed face of tube t, as shown. The lower end of tube t is conically tapered down to an exit port 8F, below which is disposed a closed cylindrical bunker cavity bb attached to exit port qF. A purging hose ph is connected to bunker bb and is terminated at its outer end in a purge port pp, which incorporates a self-sealing manually-operable closure (flap f), as shown in FIG. (3).

Incoming air enters Cyclone Filter F by means of tangential entry port tep, which is fashioned in the upper closed end of tube t and constrains the incoming air to enter the filter in a direction tangential to the cylindrical inside wall of tube t. Since its only means of escape is via the open lower end of exhaust port x, the air will commence to flow in a circular, helical motion down the inside wall of tube t. As the air travels downward, it encounters the conically tapered section ct of the lower end of tube t; this increases air velocity, while at the same time drawing air toward the open end of exhaust port x. This combined sudden increase in air velocity and sudden change in direction, serves to inertially and centrifugally separate out (vs. inward, spiral air-flow drag) dust and debris particles entrained in the air,—these being driven against the conically tapered lower wall ct, and moving down the wall (under gravity) until they enter exit port qF and pass into bunker cavity bb. The use of a cyclonic filter, in general, is known in other fields, such as the mining and food-processing, to filter (separate) particulate matter from an air stream. In certain cases, guide vanes may be used to help initiate this desired rotational, inward-spiralling flow.

Figure 5:
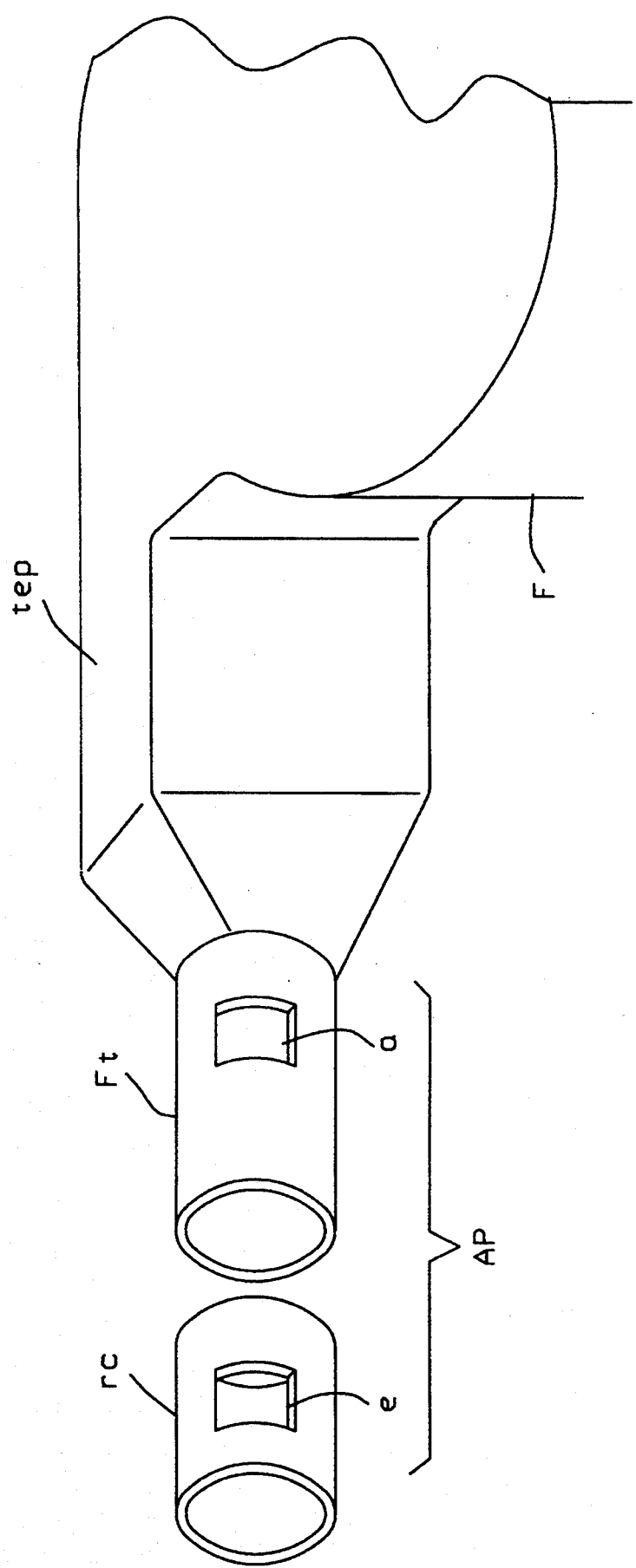

Variable Aperture (FIG. 5)

The hose portion leading to tangential entry port tep of filter F is preferably provided with variable aperture means to permit selectible entry of outside air and so provide an adjustment of the level of vacuum (negative pressure) in hose H, plenum P and in manifold M at vacuum ports V. The construction of this variable aperture is shown in detail in FIG. (5). It consists of an entry tube Ft projecting from port tep (Ft having aperture a) and a cylindrical rotatable collar rc which fits closely on the outside of said tube Ft and is provided with a second similar aperture e. By rotating said collar rc around the outside of said tube Ft the area of the resultant aperture formed by the overlap of said individual apertures a,e may be infinitely varied from zero to the total area of said aperture a.

In this manner, the system may be adjusted to give a known vacuum level in hose H, plenum P and at vacuum ports V—this being optimally matched to the velocity of the transported documents, the operation of pressure switch S1, the vacuum and airflow characteristics of cyclonic filter F, damping means D and any minor variations in the various components. This adjustment is preferably performed only once, during the assembly of the system, and will thereafter remain unchanged. Once adjusted correctly, the position of collar rc may be fixed (e.g., by means of an integral, circumferential clamp ic)

Bunker (FIG. 3)

With reference to FIG. (3), cylindrical bunker bb is provided with a purge hose ph, which terminates in a purge port pp mounted on the exterior face of the machine in some convenient location. This purge port is provided with a normally-closed manually-operable door, or sealing flap f, and is fashioned to accept coupling of the suction hose of a standard vacuum cleaner. In normal operation, purge port pp is sealed closed and purge hose ph forms a dead air volume which has no impact on operation. When it is desired to remove accumulated debris from bunker bb, flap f may be opened and a vacuum cleaner connected to purge port pp and the accumulated material sucked out in a matter of seconds. Since this may temporarily alter the pressure differentials within the system, this procedure should be performed at a convenient opportunity while the system is idle. However, this purge process will have no impact upon the subsequent operation of the system, and may be performed at any time, by untrained personnel, and without the need for subsequent checking or adjustment of the system (e.g., no need to retune, vs when a barrier filter is changed).

Figure 1:
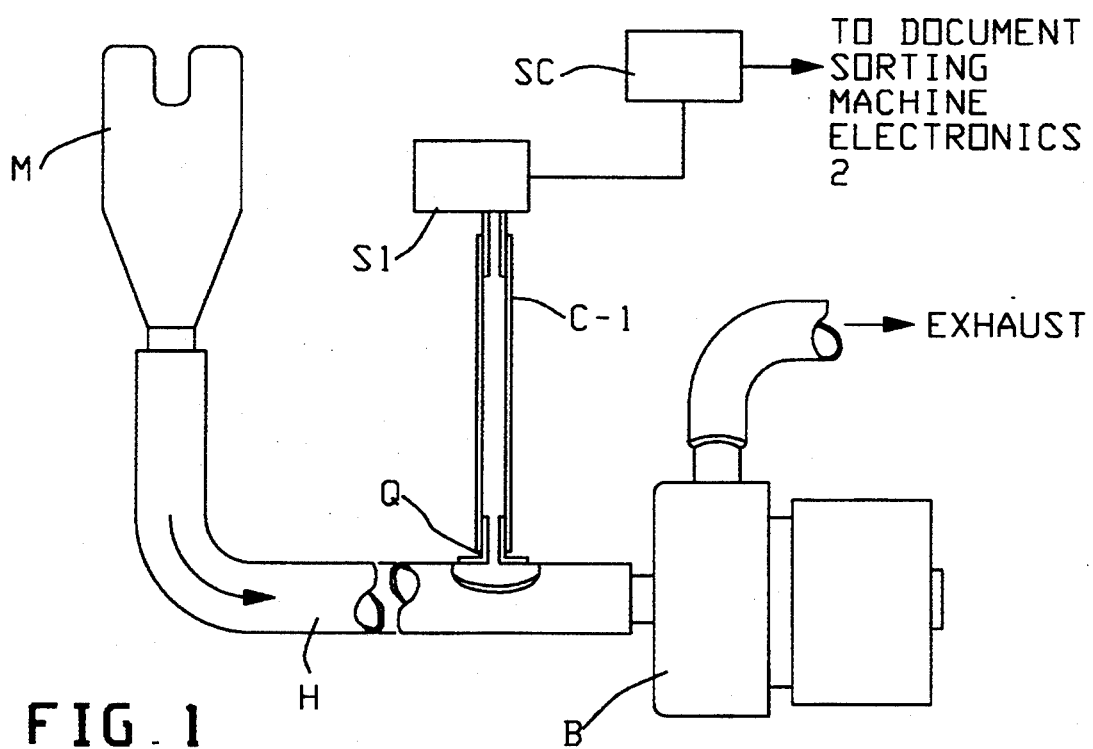
Figure 1A:
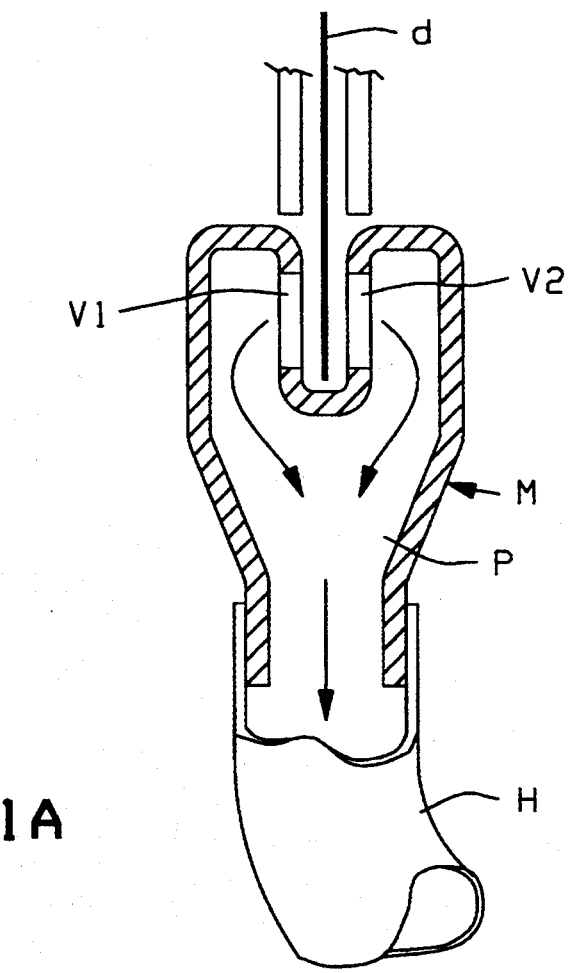
Figure 2:
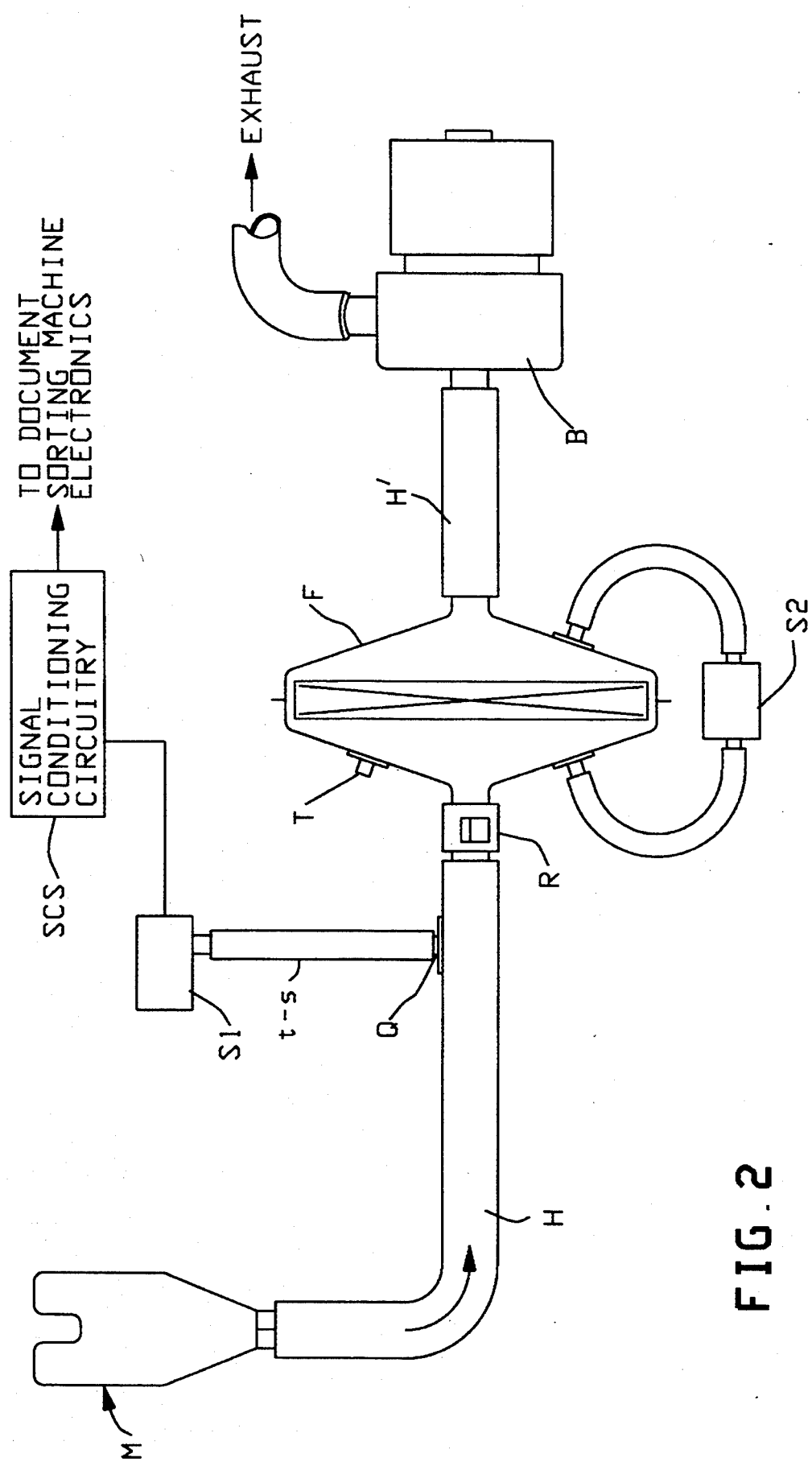

This is a tremendous advantage over barrier-filter systems like that in FIG. 2! Our testing has shown that in an identical system running an identical schedule, where the previous design incorporating an air filter required replacement of the filter every 2 working days, this preferred embodiment would perform without significant variation for approximately 100 days before it was felt necessary to empty the bunker. (a 1:50 improvement.) Moreover, where such a barrier-filter gradually, and continually, degrades vacuum, and must be "retuned" after each filter change (with the whole machine DOWN the while-something which can be expensive, and is to be avoided!), no significant pressure variations at all occur with this embodiment.

Exhaust port x of cyclonic filter C is attached to blower means B, and the exhaust from blower B is ejected from the machine at some suitable point.

Constant Vacuum

It was surprising that such a cyclone filter/blower arrangement could deliver adequate suction for the described doubles-detection/-separation (and related sensing), while also providing adequate filtering, and yet do all this while keeping the suction level almost perfectly constant (for this level of particulate flow). This is especially unexpected in light of the very small size of the cyclone filter/blower (or vacuum pump) which is preferred. For example, note filter/pump F' adapted for check processing apparatus Mm in FIGS. 6, 7. The filter is roughly one ft. high overall and has a bunker bb' of clear plastic so an attendant can readily "eyeball" how full it is. Bunker bb' has a purge port pp' which is led via purge hose ph to the exterior of apparatus Mm for easy access to suction clean-out means. Preferably bb is sized to be filled in several months of average service (e.g., here about 43 cubic in. was found suitable). The filter is about 4–5" in diameter (upper cyl.) and has in-/out-conduits about 1" diameter. The checks are driven past manifold M (e.g., by belts) at about 300 in/sec (1800 checks/min) with the manifold (ports) facing the lower 20–25% of each check. A 30 CFS vacuum pump (B) is found to pull about 30 in. water vacuum, giving a $-6$ to $-9$ in. water vacuum at the plenum with no check present (about $-10+$ in. water for both ports covered). Despite its simplicity and tiny size such a filter/pump is found quite satisfactory.

Printer Exhaust (FIG. 8)

As an added feature, we prefer to also use such a cyclone filter/blower for drawing off excess "ink mist" from the reservoir of an ink jet printer—where such is used operatively adjacent a "doubles detect/-separate" unit as aforedescribed—something we were surprised to discover was readily possible.

Now, at first we used more conventional blower means for both—e.g., as very schematically indicated in FIG. 8, where one blower $B_1$ was used to support a doubles detector DD, and a second blower $B_2$ was used to drive the heads. $B_1$ could also be used to draw-off the excess ink mist from above the ink reservoir 1R of a conventional inkjet printer (e.g., see print-heads h-1, h-2, h-3 h-4). When a cyclone filter/blower array as in FIG. 3 was coupled to also draw-off excess reservoir ink-mist (e.g., see phantom connection iJ in FIG. 3) we were surprised to see how readily the ink-mist was also disposed of in filter F (e.g., ink droplets drying and depositing into bunker bb). It will likely be preferred to place a choke in the line to reservoir 1R to reduce the level of suction, however.

While the foregoing diagrams shown are schematic, it will be understood by workers in the art that they are intended to show an idealized system and make no direct reference to pressure drops or variations which may occur in the system. Therefore, consistent with known good practice, such a system is preferably constructed with hose and interconnection means kept as short and straight as possible, and with variations in the diameter and section of such means kept to a minimum, in order to keep pressure losses and variations to a minimum, consistent with the requirements of integrating such a system into a check-processing machine.

CONCLUSION

While vacuum-separation systems are here seen as particularly advantageous for use in automated high-speed check sorting machines, as described, workers will readily understand that they have utility for other, analogous applications, such as high-speed currency handling, printing, document-processing and like arts, which require a high-speed means for handling and reliably detecting multiple documents or like sheet units carried along a track.

In conclusion, it will be understood that the preferred embodiment(s) described herein are only exemplary, and that the invention is capable of many modifications and variations in construction, arrangement and use without departing from the spirit of the claims.

The above examples of possible variations of the present invention are merely illustrative and accordingly, the present invention is to be considered as including all possible modifications and variations coming within the scope of the inventions as defined by the claims appended hereto.

What is claimed:

1. A method for differentiating and separating multiple overlapped like documents from single like items, transported along track means, this method comprising: subjecting said documents to opposed vacuum forces from suction means to separate them at a separation-station; then determining the state of the documents, whether single or multiple, by measuring and analyzing the resulting pressure differentials within the suction system; while providing this system being provided with cyclonic filter means for removing and storing dust and debris entrained within the suction-conducting air flow, said cyclonic filter means and suction means being designed and adapted to provide a relatively constant vaccum-generating airflow regardless of the nature or quantity of debris removed; and providing the said suction system with pressure sensing means constructed and adapted to indicate whether one or several documents are passing said station.

2. The method of claim 1, wherein twin opposed vacuums are applied to the passing documents by means of a single combined vacuum manifold, said manifold being made to comprise two vacuum ports so constructed and adapted as to impart opposing vacuum forces to both sides of said passing documents.

3. The method of claim 2, wherein said single combined vacuum manifold further incorporates a combined plenum, constructed and adapted to provide equal vacuum force to both said vacuum ports from a single vacuum source, and such plenum is further adapted to provide sense port means for attachment of pressure sensing means as close as possible to both said vacuum ports.

4. The method of claim 1, wherein the cyclonic filter means is further provided with a variable aperture at its input side, said aperture being infinitely adjustable in area from zero to a calculated upper limit and serving to admit outside air into the system and so permit adjustment of airflows, pressures and vacuums within the system.

5. The method of claim 1, wherein said cyclonic filter means is further provided with an enclosed attached bunker means whereby filtered and separated debris may be collected and stored without impact upon the operation of the system.

6. The method of claim 1, wherein the fail-safe means for sensing loss of vacuum comprises a differential pressure switch to compare the pressure inside the system with that outside, said switch being calibrated to indicate total loss of vacuum.

7. The method of claim 6, where said fail-safe means for detecting loss of vacuum is constructed and adapted to incorporate mechanical damping means for attenuating damping and suppressing undesired fluctuations in said airflows.

8. The method of claim 1, wherein said suction means and cyclonic filter means are also coupled to ink jet printer means and adapted to remove ink mist therefrom.

9. The method of claim 1, wherein said station is made to comprise a manifold with a pair of like opposed vacuum-ports.

10. The method of claim 9, wherein said ports are joined to plenum means coupled pneumatically to pressure-sensing means adapted to indicate whether a single or multiple document is present.

11. The method of claim 1, also including providing said system with fail-safe means to indicate whether said suction falls to zero, and further providing said pressure sensing means with variable damping means, both mechanical and electronic.

* * * * *